United States Patent [19] [11] 3,726,907
Tesoro et al. [45] Apr. 10, 1973

[54] REACTIVE POLYFUNCTIONAL SILANES
[75] Inventors: Giuliana C. Tesoro, Dobbs Ferry, N.Y.; Wing Kai Lee, Hackensack, N.J.
[73] Assignee: J. P. Stevens & Co., Inc., New York, N.Y.
[22] Filed: July 13, 1970
[21] Appl. No.: 61,036

Related U.S. Application Data

[62] Division of Ser. No. 640,388, May 22, 1967, Pat. No. 3,576,033.

[52] U.S. Cl. ........260/448.8 R, 117/141, 117/143 R, 117/143 A, 161/206, 161/209, 260/46.5 E, 260/77.5 R, 260/77.5 CH, 260/448.2 N
[51] Int. Cl. ................................................C07f 7/18
[58] Field of Search ...............................260/448.8 R

[56] References Cited

UNITED STATES PATENTS 3,576,033  4/1971  Tesoro et al. ...................260/448.8 R
3,657,303  4/1972  Golitz et al.................260/448.8 R X Primary Examiner—James E. Poer
Assistant Examiner—P. F. Shaver
Attorney—J. Bradley Cohn et al.

[57] ABSTRACT

This invention relates to novel silyl ureas useful as finishing agents. These compounds are of the structure:

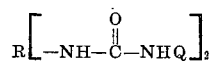

wherein R is a divalent organic radical selected from the group consisting of:
  a. chains of linear polymers terminated on both ends by arylenecarbamoyl radicals of the structure

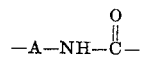

wherein A is arylene, and
  b. hydrocarbon radicals,
wherein Q is a silyalkyl radical having affixed to the silicon atom three substituents selected from the group consisting of alkyl, alkoxy, and aryloxy at least one substituent of which is selected from the group consisting of alkoxy and aryloxy, with the proviso that said alkyl moiety of the silyalkyl can be interrupted by ether oxygen (—O—), and imino groups

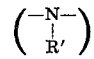

wherein R' is selected from the group consisting of hydrogen, aryl and alkyl.

7 Claims, No Drawings

REACTIVE POLYFUNCTIONAL SILANES

The present application is a divisional of application Ser. No. 640,388, filed May 22, 1967 now U.S. Pat. No. 3,576,033.

This invention relates to novel polyfunctional silanes useful as finishing agents and as intermediates for preparing finishing agents.

More particularly this invention concerns novel silyl ureas of the structure:

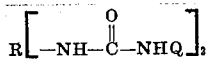

wherein R is a divalent organic radical selected from the group consisting of:
a. chains of linear polymers terminated on both ends by arylenecarbamoyl radicals of the structure

wherein A is arylene, and
b. hydrocarbon radicals,
wherein Q is a silylalkyl radical having affixed to the silicon atom three substituents selected from the group consisting of alkyl, alkoxy, and aryloxy, at least one substituent of which is selected from the group consisting of alkoxy and aryloxy, with the proviso that said alkyl chain can be interrupted by an ether oxygen (—O—), and imino groups

wherein R' is selected from the group consisting of hydrogen, aryl and alkyl. These products, particularly those wherein at least two alkoxy groups are affixed to the silicon atom, are useful as water repellents in cellulosics such as cotton and as dimensional stabilizers in proteinaceous substrates such as wool.

Within recent years a good deal of effort has been expended to develop water repellents for cellulosics and dimensional stabilizers for proteinaceous substrates. The development of reagents for these purposes extends the applications for which cotton and wool textile materials can be employed and for this reason is of considerable interest in the textile industry.

The development of water repellents for cellulosic garments particularly is difficult because of the rather unique combination of properties that is desired. Not only must the water repellent perform its primary purpose of resisting water, but in addition, the repellent should desirably:
a. possess air permeability,
b. upon application, have a smooth hand,
c. show good durability after repeated launderings,
d. be adaptable to existing application equipment, and
e. lend itself to application by technically untrained personnel.

The novel products of this invention combine the desired traits and therefore represent an advance in the art.

It is an object of this invention, among others, to prepare novel products useful in improving the properties of both cellulosic and proteinaceous substances.

Another object of this invention is the preparation of homopolymers and copolymers of the above products which are useful as coatings and finishing agents.

A further object of this invention is the development of processes for improving the water resistance of fabrics and garments, particularly of those containing substantial proportions of cellulosic fibers, by the application of the above-mentioned silane-containing reagents.

Additional objects will become apparent to those skilled in the art after a perusal of this application.

In practice, a divalent organic diisocyanate reactant whose generic formula is:

wherein R is defined as described infra, is contacted with an aminosilane generically represented as:

wherein Q is a silylalkyl radical, under time, temperature and pressure conditions sufficient to produce the above-defined silyl ureas of the structure:

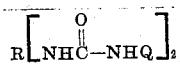

wherein R and Q are as previously defined, is formed.

The diisocyanate reactants of the invention can be generically represented by the structure:

wherein R is selected from two classes of radicals:
a. chains of linear polymers terminated on both ends by arylenecarbamoyl radicals of the structure

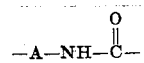

wherein A is arylene, and
b. hydrocarbon radicals.

The first group of values that the radical R can assume in the above formula comprises:
a. Linear polymers terminated on both ends by arylenecarbamoyl radicals of the structure

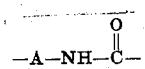

wherein the symbol A is arylene. This class can be more clearly expressed symbolically within the structure:

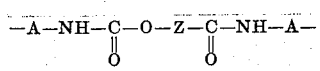

wherein A is arylene and Z in the above formula is selected from the group consisting of:
1. polyalkyleneoxy or polyoxyalkylenes ($—C_pH_{2p}O—)_n$, wherein $p$ ranges between 3 and 6, and $n$ is between 2 and 200,
2. the chain of a linear polyester

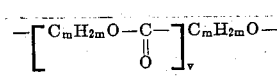

wherein $m$ ranges between 2 to 10, and $v$ ranges between 2 and 80,
3. the oxygen-terminated chain of a polymer of an alkadiene such as 1,4-butadiene, $\{CH_2CH=CHCH_2\}_uO$, wherein $u$ is the degree of polymerization, averaging in range from about 6 to about 100.

The hydrocarbon radicals which comprise the second class (b) largely comprise two subclasses:
1. arylene radicals such as phenylene, methylphenylene, dimethylphenylene, and the like, and
2. aliphatic or cycloaliphtic radicals derived by polymerizing a saturated or unsaturated fat acid having 8 to 24 carbon atoms. The preparation of dimeric fat acids is disclosed in British Patent No. 1,023,390, published Mar. 23, 1966. As indicated in the patent, the term "fat acids" includes naturally occurring or synthetic saturates, ethylenically unsaturated and acetylenically unsaturated acids. The term polymeric fat radical is generic to the divalent, trivalent and polyvalent radicals of dimerized, trimerized and higher polymers of fat acids. Particularly of interest are members of the class of dimeric fat radicals, D , which are hydrocarbon radicals of dimerized fat acid. A preferred group of hydrocarbon radicals are of the structure:

$$-CH_2-D-CH_2-.$$

these structures are preferred because they readily lend themselves to the preparation of the corresponding diisocyanates.

The Q portion of the aminosilanes which are utilized as coreactants with the diisocyanates can also vary somewhat. For example, the following are illustrative of some permissible structures:

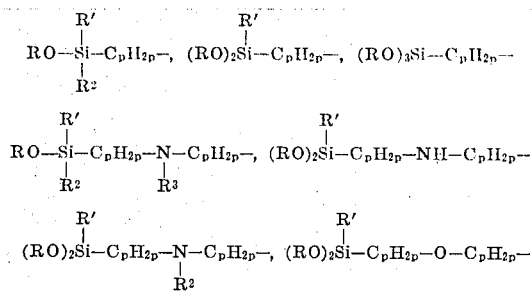

wherein R is selected from the group consisting of alkyl, aralkyl and aryl, and R', R² and R³ which can be the same or different at any given time, are selected from the group consisting of aryl and alkyl groups, and $C_pH_{2p}$ is an alkylene radical in which $p$ varies between 2 to 10 inclusive. Typical alkylene groups are:

$$-CH_2-CH_2-CH-CH_2-$$
$$\phantom{-CH_2-CH_2-}|$$
$$\phantom{-CH_2-CH_2-}CH_3$$

$$-CH_2CH_2-,$$

$$-CH_2CH_2CH_2-,$$

$$-CH_2CH_2CH_2CH_2,$$

$$-CH_2CH-CH_2-$$
$$\phantom{-CH_2}|$$
$$\phantom{-CH_2}C_2H_5$$

and the like.

The preferred amino silanes are those within the structure:

$$(RO)_3Si-C_pH_{2p}NH_2$$

wherein $p$ is an integer less than 25.

The reaction conditions used to produce the novel silyl ureas of this invention are not critical and closely resemble those utilized in the addition of primary amines to diisocyanates in organic chemistry. Ordinarily, inert solvents such as the hydrocarbons and halogenated hydrocarbons are utilized, temperatures between about 20°C and 75°C are employed although higher and lower temperatures can be employed if desired. Moisture must be excluded from the reaction mixture. Near stoichiometric proportions of reactants are used and ordinarily the reactions are run at atmospheric or near atmospheric pressure although the solvents are commonly stripped off under reduced pressure. The reaction time varies according to the reactants employed and the temperature at which the reaction is run and therefore cannot be stated precisely. However, at temperatures of about 20°-35°C most reactions are complete within 4 to 24 hours. Longer times are not harmful.

While all of the silyl urea products are useful products, as in any large group, certain members of the group are to be preferred to the group as a whole. In this instance, products form by the reaction of silanes of the formula:

$$(R'O)_3Si-C_pH_{2p}-NH_2$$

wherein R' is alkyl, aryl or alkoxyalkyl and $C_pH_{2p}$ is a divalent alkylene radical containing from 3 to 25 carbon atoms, with a diisocyanate of the formula:

$$D[(CH_2)_wN=C=O]_2$$ wherein D is a saturated or unsaturated hydrocarbon radical of dimeric fat acids, and $w$ is a number selected from zero and one.

The resultant products are durable water repellents for cellulosics and can be prepared from inexpensive starting materials.

To better illustrate the workings of this invention in more detail, the following preparation and application examples are submitted. In all instances, weight measurements are in parts by weight unless otherwise noted.

EXAMPLE 1

Preparation of the Reactive Polyfunctional Silane Produced by the Addition of 3-(Triethoxysilyl)propylamine to a Diisocyanate Derived from Dimerized $C_{18}$ Unsaturated Fatty Acids

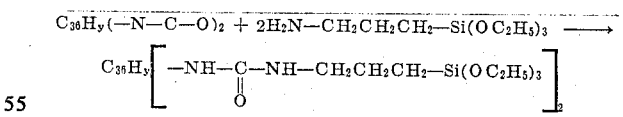

The diisocyanate used as starting material is obtained from the $C_{36}$ dibasic acid resulting from the controlled dimerization of $C_{18}$ unsaturated fatty acids. The average value of y is approximately 66. A commercial grade having 14% —N=C—O is used containing less than 0.1 percent hydrolyzable chloride assaying at least 98 percent, and having a viscosity at 20°C of 170 centipoises.

A solution consisting of 120 grams (0.2 mole) of the diisocyanate in 100 ml. of benzene is added dropwise at room temperature to a stirred solution of 88.4 grams (0.4 mole) of 3-(triethoxysilyl)propylamine in 100 ml.

of benzene. After the addition is complete, the reaction mixture is stirred at room temperature for 8 hours. Then the solvent is partially removed by distillation under reduced pressure. The residual material weighs 238 grams. It has a solid content of 168 grams, corresponding to a yield of 81 percent.

The absence of bands at 2270 cm.$^{-1}$ in the infrared spectrum (obtained with chloroform as the solvent) indicates that substantially all of the isocyanate groups react. Absorption bands at 3,400 to 3,100 cm.$^{-1}$ characteristic of secondary amide groups are observed.

characteristic of secondary amide groups, are observed, verifying the presence of ureylene chains

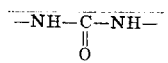

in the structure of this reactive silane.

EXAMPLE 3

Preparation of the Reactive Polyfunctional Silane Produced By the Addition of 3-(Triethoxysilyl)propylamine to a Diisocyanate Derived from a Polymer of Butadiene First Stage:

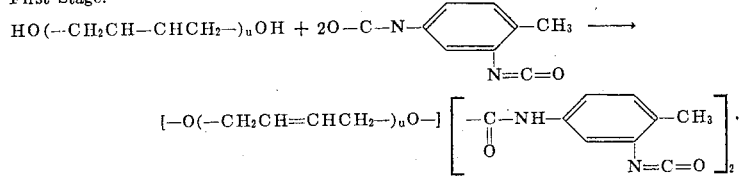

Second Stage:

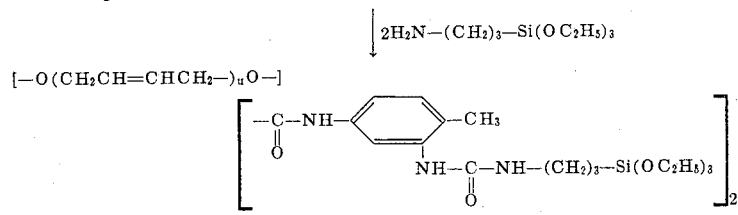

Those facts verify the di-substituted urea type of structure for the product shown in the above equation.

EXAMPLE 2

Preparation of the Reactive Polyfunctional Silane Produced By the Addition of 3-(Triethoxysilyl)propylamine to a Diisocyanate Derived from a Linear Polyester

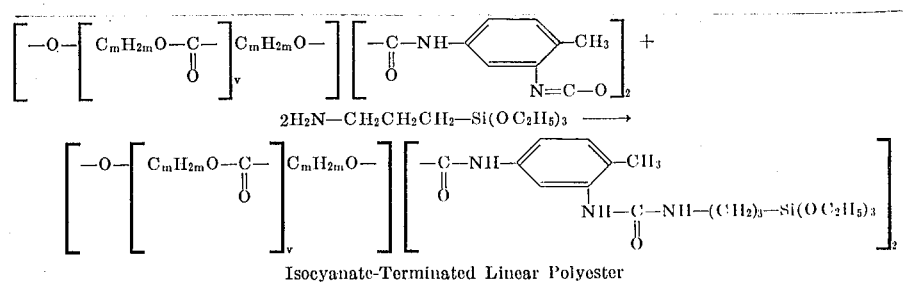

Isocyanate-Terminated Linear Polyester

The isocyanate-terminated linear polyester used as starting material has the type of structure indicated above;

$m$ is about 6, and $v$ mainly 3 and 4.

The material has a 9.5% —N=C=O assay, equivalent to 2.26 milliequivalents of —N=C=O per gram.

A solution of 100 grams (0.226 equivalent) of that diisocyanate in 100 grams of dichloromethane is added dropwise at room temperature to a stirred solution of 50.0 grams (0.226 mole) of 3-(triethoxysilyl)propylamine in 100 grams of dichloromethane. After completion of the addition, the reaction mixture is allowed to stand overnight at room temperature. Then solvent is distilled off under reduced pressure.

The absence of bands at 2270 cm.$^{-1}$ in the infrared spectrum (obtained with chloroform as the solvent) indicates that substantially all of the isocyanate groups have reacted. Absorption bands at 3400 to 3100 cm.$^{-1}$, First Stage:

The hydroxyl-terminated polybutadiene used as starting material is a technical grade having a hydroxyl content of 0.80 milliequivalent per gram an iodine number of 395, and an average molecular weight of 3250 ± 250. The degree of polymerization, $u$, is 60 ± 5 on the average.

The following procedure is used to convert the hydroxyl-terminated polybutadiene into essentially linear macromolecules terminated on both ends with isocyanate groups. A 2-liter, 3-neck flask equipped with a stirrer, a thermometer, a gas inlet tube, and a dropping funnel is charged with 200 grams of the hydroxyl-terminated polybutadiene dissolved in 200 grams of dichloromethane. Toluene diisocyanate (43.6 grams, 0.25 mole of "2,4" and "2,6" isomers in the ratio of 8/20) is added slowly while a stream of nitrogen is passed into the solution and the temperature is maintained at 20°C. After completion of the addition, the solution is stirred at 25° to 28°C. for 8 hours.

Second Stage:

In order to replace the terminal isocyanate groups by reactive Si-containing groups, a solution consisting of (a) 159 grams of the intermediate produced in the First Stage (namely the diisocyanate derived from a polymer of 1,4-butadiene) and (b) 100 grams of dichloromethane is added dropwise at room temperature to a stirred solution of 26.5 grams (0.12 mole) of 3-(triethoxysilyl)propylamine in 100 grams of dichloromethane. After completion of the addition, the reaction mixture is allowed to stand overnight at room temperature. Then solvent is distilled off under reduced pressure at room temperature until the residual material attains constant weight.

The absence of bands at 2270 cm.$^{-1}$ in the infrared spectrum (obtained with chloroform as the solvent) indicates that substantially all of the isocyanate groups have undergone reaction. Absorption bands at 3400 to 3100 cm.$^{-1}$ characteristic of secondary amide groups are in evidence, as would be expected from the presence of divalent ureylene chains in the structure of this reactive bis(triethoxysilyl) compound.

EXAMPLE 4

Preparation of the Reactive Polyfunctional Silane Produced by the Addition of 3-(Triethoxysilyl)propylamine to Toluene Diisocyanate

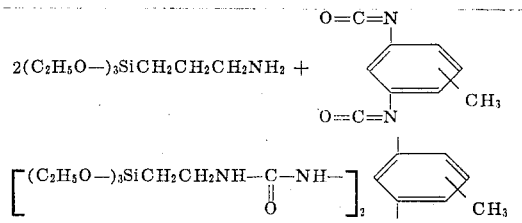

A solution of 87 grams (0.5 mole of "2,4" and "2,6" isomers in the ratio of 80/20) of toluene diisocyanate in 100 grams of dichloromethane is added slowly to 221 grams (1.0 mole) of 3-(triethoxysilyl)propylamine in 600 grams of dichloromethane at room temperature. Analysis, in the manner used in EXAMPLE 3, confirms that the product had the structure shown above. This reactive polyfunctional silane, namely 1,1'-(methyl-m-phenylene)bis-[3-[3-(triethoxysilyl)propyl]urea], is applied to cotton, imparting water repellency, and to wool, minimizing shrinkage in laundering.

The finishing agents of this invention can be applied to the textile substrate by a number of conventional application methods well known in the textile art. These include, but are not limited to brushing, spraying, padding, coating, and the like. The agents can be in the form of solutions, slurries, suspensions, emulsions, or the like, where appropriate; the main requirement being that an effective quantity of finishing agent is deposited on the textile substrate treated. By an effective quantity is meant, that quantity of reagent required to impart the desired characteristics to the treated substrate. Because of the experimental variables and the effect sought, this "amount" cannot be stated with precision. However, in the case of cotton, depending upon the reagent, an effective water repelling quantity ranges between ½ to 10 percent, by weight of reagent based upon the weight of the treated substrate. Usually, the amount employed ranges between 2–6 percent, by weight of reagent, although the upper limit of reagent concentration is primarily limited by economic considerations. Similarly, an effective quantity of dimensional stabilizing reagent that is required to stabilize proteinaceous substrates ranges between ½ to 10 percent by weight of reagent based upon the treated substrate, but usually between 2–6 percent by weight of reagent. Again, the upper limit of reagent being governed by economic limitations. Ordinarily, it is convenient to utilize an inert solvent where solutions are employed. The choice of solvent is not critical as long as it possesses good solubilizing characteristics and it is devoid of reactive groups which could react with the silyl groups. Illustrative inert solvents include tertiary amides such as N,N-dimethylformamide, N,N-dimethylacetamide, 1-methyl-2-pyrrolidinone, 1,5-dimethyl-2-pyrrolidinone, cyclic ethers such as the dioxanes and trioxanes, aliphatic ethers such as $CH_3OCH_2CH_2OCH_3$ and sulfoxides such as dimethyl sulfoxide.

A convenient mode of application is padding. In this procedure, the textile is impregnated with a solution of the reagent in inert solvent, the rolls of the padder being set to the desired wet pickup. The treated textile is dried, usually between about 40°C to 85°C and cured above 100°C. The cured, dried samples are usually moisture conditioned to the desired moisture content by exposing them to an appropriate humidity level.

In addition to the finishing reagents of this invention, the padding bath can contain one or more various optional textile adjuvants such as softeners, conditioners, surfactants and the like. Since these reagents are not critical to the success of this invention, no attempt is made to enumerate the various adjuvants that can be employed. It will suffice to say, exhaustive lists of these can be found in the technical and patent literature.

EVALUATION TEST METHODS

Dry Cleaning:
  Durability test: Commercial equipment and formulation are used.
Flex Abrasion Resistance in Cycles:
  ASTM D–1175–61T; 0.5-pound head weight and 2-pound toggle tension on Stoll Flex Abrader.
Laundering Method for Cotton Having Water Repellent Finish:
  Home-type machine: low (11-gallon) water level; 4-pound load; FAB or TIDE detergent; normal agitation; 12-minute wash cycle at 60°C rinse at 43 ± 3°C; normal rinse and spin cycle; tumble-dry at 74°C; flat-bed pressing at 135° to 149°C for 5 seconds without steam; recondition for at least 4 hours (relative humidity at 65 ± 2%, 21 ± 1°C).
Laundering Method for Washable Woolens:
  First, the swatch is conditioned for at least 4 hours (relative humidity at 65 ± 2%, 21 ± 1°C), and markings are applied 10 inches apart, then: laundered in home-type machine; full water level; 5-pound load; FAB or TIDE detergent; 15-minute wash at 40°C; running suds 1.5 to 2 inches; automatic rinse; dried flat on horizontal screen; flat-bed pressing at 135° to 149°C for 5 seconds without steam; reconditioned for at least 4 hours and re-measured.
  The number of cycles (as 0, 1 or 10), of laundering and tumble drying is indicated by No L, 1L, or 1.L, respectively.
Shrinkage in Laundering in percent:
  See "Laundering Method for Washable Woolens" above.
Stiffness Test:
  Results in milligrams per centimeter: ASTM D1388–55T Cantilever Method.
Water Repellency Spray Rating:
  AATCC Test Method 22–1964, Manual of the American Association of Textile Chemists and Colorists, 1964 Edition, pages B–130–131.
Xylene Extraction:

Refluxing for 2 hours.
Parts and Percentages:
By weight, unless otherwise noted.
Abbreviations in Tables:

When used individually, F means filling direction, and W means warp direction. Note the special meanings of the following 3-letter abbreviations.

OWB:

On the weight of the bath. The term is applied when expressing the concentration (%) of an ingredient in the liquid mixture used for impregnating samples of fabric.

OWF:

On the weight of fiber (or fabric), i.e., based on the weight of fabric prior to padding. The percentage of a reagent OWF means the add-on of solids expressed in % on the dry basis.

WPU:

Wet pickup, i.e., the wet add-on (usually expressed in percentage OWF) which is the gain from solution penetrating the fabric, measured immediately after padding. As used herein, padding consists of the dual process of impregnating the fabric by passing it through a pad bath and then passing the wet fabric through squeeze rollers or wringers.

When expressed in percent, the foregoing terms are related as follows:

(% OWB) multiplied by (% WPU)/100% = (% OWF).

EXAMPLE 5

Application of the Disilane of Example 1 to Cotton to Impart Water Repellency

Samples of 100% cotton fabric (8 ounces per square yard in a twill weave) are conditioned with the relative humidity at 65 ± 2% (21 ± 1°C) and weighed on an analytical balance. Then they are impregnated with a 5 percent (active basis, by weight) solution in p-dioxane of the disilane of EXAMPLE 1. The impregnation is effected on a laboratory padder. Its rolls are set at a pressure which results in a wet pickup of 62 to 67 percent, as detailed in the accompanying table. The fabric samples so treated are dried at 50° to 60°C. Samples of the B, C, and D series are overpadded with aqueous dispersions (pH between 6 and 7) of catalysts, as noted in the following table. (When the pH of the aqueous dispersion of the catalyst have to be lowered to 6.5 ± 0.5, this is accomplished by means of acetic acid.)

|  | Disilane of Example 1 | | Catalysts* | | Heat treatment (temp. of curing, °C.) | Actual weight gain, percent | Xylene extraction | | Water repellency spray rating after— | | |
|---|---|---|---|---|---|---|---|---|---|---|---|
|  | WPU, percent | OWF, percent | Organo-functional Type 81, percent | Metal org. salt Type 128, percent |  |  | Weight loss, percent | Loss of weight gain, percent | Originally (No L) | Laundering | Dry cleaning |
| Sample: |  |  |  |  |  |  |  |  |  |  |  |
| A1 | 67 | 3.35 | None | None | 150 | 3.97 | 0.70 | 16 | 0/50 | 0/50 | 70 |
| A2 | 62 | 3.10 | None | None | 177 | 4.53 |  |  | 0/50 | 0/50 | 70 |
| A3 | 63 | 3.15 | None | None | Steamed | 3.57 |  |  | 50 | 50 | 70 |
| B1 | 62 | 3.10 | 0.1 | None | 150 | 4.06 | 0.56 | 17 | 70 | 70 | 70 |
| B2 | 63 | 3.15 | 0.1 | None | 177 | 3.50 |  |  | 70 | 50 | 70 |
| B3 | 62 | 3.10 | 0.1 | None | Steamed | 3.38 |  |  | 50/70 | 50 | 70 |
| C1 | 62 | 3.10 | None | 0.6 | 150 | 3.34 | 0.52 | 13 | 50 | 50 | 50/70 |
| C2 | 63 | 3.15 | None | 0.6 | 177 | 4.18 |  |  | 50 | 50 | 50 |
| C3 | 64 | 3.20 | None | 0.6 | Steamed | 3.39 |  |  | 50/70 | 50 | 50/70 |
| D1 | 63 | 3.15 | 0.1 | 0.6 | 150 | 3.29 | 0.21 | 7 | 50 | 50 | 50/70 |
| D2 | 63 | 3.15 | 0.1 | 0.6 | 177 | 3.10 |  |  | 70 | 70 | 50/70 |
| D3 | 62 | 3.10 | 0.1 | 0.6 | Steamed | 3.52 |  |  | 70 | 50/70 | 50/70 |
| Control |  |  |  |  |  |  |  |  | 0 | 0 | 0 |

*Catalysts: Products of Dow Corning Corp. (50% solids and pyridine carrier for Type 81; 28% solids for Type 128).

All samples are dried at 50° to 60°C, then cured on a frame for 5 minutes at the temperature shown in the table, or the samples are exposed to dry steam for 15 minutes. Next, they are rinsed thoroughly in p-dioxane and then in water. After the samples have been allowed to dry, they are conditioned with the relative humidity at 65 percent. The conditioned samples are weighed on an analytical balance to determine weight gains. Treatment data are shown in the first section of the table. Performance with respect to water repellency is shown in the second section of the table.

|  | Disilane of Example 2 | | | Catalysts * | | Heat treatment (cured 5 min. at 163° C. or steamed 10 minutes) | Water repellency spray rating | |
|---|---|---|---|---|---|---|---|---|
|  | OWB, percent | WPU, percent | OWF, percent | Organo-functional Type 81, percent | Metal org. salt Type 128, percent |  | Originally (No L) | After laundering |
| Sample: |  |  |  |  |  |  |  |  |
| A | 5.5 |  |  | None | None | Cured | 50 | 50 |
|  |  |  |  |  |  | Steamed | 50 | 50 |
| B | 5.5 | 58 | 3.2 | 0.1 | None | Cured | 50 | 50 |
|  |  |  |  |  |  | Steamed | 50 | 50 |
| C | 5.5 | 58 | 3.2 | None | 0.6 | Cured | 50 | 50 |
|  |  |  |  |  |  | Steamed | 50 | 50 |
| D | 5.5 |  |  | 0.1 | 0.6 | Cured | 50 | 50 |
|  |  |  |  |  |  | Steamed | 50 | 50 |
| E | 1.7 | 60 | 1.0 | None | None | Cured | 50 | 0/50 |
|  |  |  |  |  |  | Steamed | 50 | 0 |
| F | 1.7 |  |  | 0.1 | None | Cured | 50 | 70 |
|  |  |  |  |  |  | Steamed | 50 | 0 |
| G | 1.7 | 60 | 1.0 | None | 0.6 | Cured | **50/70 | 50 |
|  |  |  |  |  |  | Steamed | 70 | 50 |
| H | 1.7 |  |  | 0.1 | 0.6 | Cured | 70 | 70 |
|  |  |  |  |  |  | Steamed | 70 | 0/50 |
| Control |  |  |  |  |  | Unheated | 0 | 0 |

*Concerning catalysts, see footnote to table of Example 5.
**Major portions of test area of cured Sample G (No. L) were wetted through at certain spray points.

EXAMPLE 6

Application of the Disilane of Example 2 to Cotton to Impart Water Repellency

Samples of 100 percent cotton fabric (8 ounces per square yard in a twill weave) are processed similarly to the procedure of EXAMPLE 5, except that (a) the disilane of EXAMPLE 2 is used instead of that of EXAMPLE 1, (b) N,N-dimethyl-formamide is the solvent instead of p-dioxane, and (c) certain percentages are different, as is apparent from the tabulated data. Samples are either cured for 5 minutes at approximately 163°C or steamed for 10 minutes, as indicated under "heat treatment".

EXAMPLE 7

Application of the Disilane of EXAMPLE 2 to Wool to Prevent Skrinkage to Laundering Sample of 100 percent wool fabric (6.15 ounces per square yard in a plain weave) are treated similarly to the cotton samples of EXAMPLE 6, except as is evident from the details of the following table, which includes evaluation results.

The overpadded sample is dried at 50° to 60°C, then is cured on a frame for 5 minutes at approximately 163°C. The remaining processing details followed the procedure of EXAMPLE 5. The spray rating of this treated sample in the test for water repellency is 50. In contrast, the second sample (untreated 100 percent cotton 8-ounce twill) has a spray rating of zero.

The third sample is treated similarly to the first sample, except that the concentration in the pad bath is 5.0% OWB, WPU is 58% giving 2.9% OWF, and the percentages of Catalyst 81 and Catalyst 128 are only 0.1 and 0.6%, respectively, in the aqueous dispersion used for overpadding. After subsequent processing as described for the first sample, this third sample has a spray rating of 70 after one laundering and also after five launderings as well.

| | Disilane of Example 2 | | | Catalysts* | | Heat treatment (cured 5 min. at 163° C, or steamed 10 minutes) | Actual weight gain, percent | Shrinkage in laundering, percent | |
|---|---|---|---|---|---|---|---|---|---|
| | OWB, percent | WPU, percent | OWF, percent | Organo-functional Type 81, percent | Metal org. salt Type 128, percent | | | W | F |
| Sample: | | | | | | | | | |
| A | 2.8 | 109 | 3.1 | None | None | Cured | 7.0 | 1.0 | |
| | | | | | | Steamed | 6.5 | 2.0 | |
| B | 2.8 | | | 0.1 | None | Cured | 5.5 | 0.5 | |
| | | | | | | Steamed | 6.5 | 1.5 | |
| C | 2.8 | | | None | 0.6 | Cured | 0.5 | 1.5 | |
| | | | | | | Steamed | 6.5 | 1.0 | |
| D | 2.8 | 110 | 3.1 | 0.1 | 0.6 | Cured | 4.5 | None. | |
| | | | | | | Steamed | 7.5 | None. | |
| E | 0.9 | 112 | 1.0 | None | None | Cured | 8.0 | 0.5 | |
| | | | | | | Steamed | 8.5 | 3.5 | |
| F | 0.9 | | | 0.1 | None | Cured | 6.5 | 0.5 | |
| | | | | | | Steamed | 8.5 | 3.5 | |
| G | 0.9 | 112 | 1.0 | None | 0.6 | Cured | 7.5 | 1.5 | |
| | | | | | | Steamed | 9.0 | 2.5 | |
| H | 0.9 | 112 | 1.0 | 0.1 | 0.6 | Cured | 8.0 | 2.5 | |
| | | | | | | Steamed | 8.0 | 1.5 | |
| I | 5.5 | 106 | 5.8 | None | None | Cured | 5.97 | 6.5 | 1.0 |
| | | | | | | Steamed | 6.10 | 7.0 | 2.0 |
| J | 5.5 | | | 0.1 | None | Cured | 6.11 | 5.5 | 0.5 |
| | | | | | | Steamed | 5.77 | 6.5 | 1.5 |
| K | 5.5 | | | None | 0.6 | Cured | 5.46 | 5.5 | 0.5 |
| | | | | | | Steamed | 5.16 | 7.5 | 1.5 |
| L | 5.5 | 102 | 5.6 | 0.1 | 0.6 | Cured | 5.83 | 5.5 | 0.5 |
| | | | | | | Steamed | 5.43 | 6.0 | 1.5 |
| Untreated control[1] | | | | | | | | 11.0 | 7.0 |

[1] 100% wool fabric; plain weave.
*Concerning catalysts, see footnote to table of Example 5.

EXAMPLE 8

Application of the Disilane of EXAMPLE 4 to Cotton to Impart Water Repellency

Three samples of 100 percent cotton 8-ounce twill are used. One was processed in a manner similar to that set forth in EXAMPLE 5, except that (a) the disilane of EXAMPLE 4 was utilized instead of the disilane of EXAMPLE 1, (b) N,N-dimethyl-formamide is the solvent rather than p-dioxane, and (c) the percentages are as follows: The concentration is 5.45% OWB, the WPU is 56% giving 3.05% OWF. The sample is dried at 50° to 60°C. Next, the sample is overpadded with an aqueous dispersion consisting of 0.7 percent of each of the catalysts described in the table to EXAMPLE 5. (The pH of the dispersion of the catalysts is adjusted to 5.5 ± 0.5 by the addition of acetic acid prior to overpadding.)

EXAMPLE 9

Application of the Disilane of EXAMPLE 4 to Wool to Minimize Shrinkage in Laundering Samples of 100 percent wool fabric (6.15 ounces per square yard in a plain weave) are conditioned with the relative humidity at 65 ± 2% (21 ± 1°C) and weighed. They are padded with a solution consisting of the disilane of EXAMPLE 4 (2.7 parts by weight), toluene (8.1 parts by weight) and N,N-dimethyl-formamide (DMF, 89.2 parts by weight). Other data pertaining to the padding are in the appended table. The fabric samples so treated are dried at 50° to 60°C. Then they are cured for 5 minutes at approximately 163°C. Next, they are rinsed in toluene, in p-dioxane, and washed thoroughly in water. Data on both treatment and evaluation are in the following table.

| | Disilane of Example 4 | | | Catalysts* | | Shrinkage in laundering, percent | | | |
|---|---|---|---|---|---|---|---|---|---|
| | OWB, percent | WPU, percent | OWF, percent | Organo-functional Type 81, percent | Metal org. salt Type 128, percent | 1 wash | | 10 washes | |
| | | | | | | W | F | W | F |
| Wool fabric sample: | | | | | | | | | |
| A | 2.7 | 112 | 3.0 | None | None | 2.5 | 0.5 | 4.5 | 1.5 |
| B | 2.7 | 111 | 3.0 | 0.1 | None | 1.5 | +0.5 | 5.0 | 0.5 |
| C | 2.7 | 111 | 3.0 | None | 0.6 | 2.0 | 0.5 | 5.5 | 1.5 |
| D | 2.7 | 110 | 3.0 | 0.1 | 0.6 | 2.5 | +0.5 | 5.0 | 0.5 |
| Control untreated | | | | | | 13.5 | 9.0 | 30.5 | 28.5 |

*Concerning catalysts, see footnote to the table of Example 5. Acetic acid was used to adjust the pH of the catalyst dispersion to 5.5±0.5.

As the above examples and previous discussion indicate, the inventive compositions are advantageous in several respects. For example, the products can be prepared from available starting materials and are formed under relatively flexible reaction conditions. In addition, the products lend themselves to textile modification since they undergo their reactions including polymerization under relatively mild conditions, enabling them to be applied by non-technically trained personnel. Finally, the silane products afford durable water repellency to textile substrates in economically feasible concentrations.

The metes and bounds of this invention, in both its product and process aspects, are best determined by reference to the claims which follow:

What is claimed is:

1. Silyl urea compounds of the formula

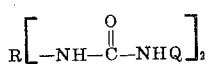

wherein R is a linear polymer represented by the formula:

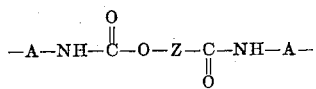

wherein A is arylene and Z is selected from the group consisting of:
   a. polyoxyalkylene of the formula $(-C_pH_{2p}O-)_n$, wherein p ranges between 3 and 6 inclusive, and n ranges between 2 and 200 inclusive
   b. the chain of a linear polyester

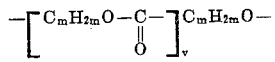

wherein m ranges between 2 and 10 inclusive, and v ranges between 20 and 80 inclusive,
   c. the oxygen-containing chain of a polymer,

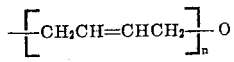

wherein the average value of u ranges from about 6 to 100 and
wherein Q is a silyalkyl radical having affixed to the silicon atom three substituents selected from the group consisting of alkyl, alkoxy, and aryloxy, at least one substituent of which is selected from the group consisting of alkoxy and aryloxy.

2. The silyl urea of claim 1 wherein Z is a polyoxyalkylene $(-C_pH_{2p}O-)_n$ wherein n ranges between 3 and 6 inclusive, and p ranges between 2 and 200 inclusive.

3. The silyl ureas of claim 1 wherein Z is the chain of a linear polyester:

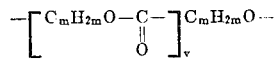

wherein m ranges between 2 and 10 and, v ranges between 2 and 80 inclusive.

4. The silyl ureas of claim 1 wherein Z is the oxygen-terminated chain of a polymer,

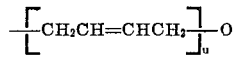

wherein the average value of u ranges from about 6 to about 100.

5.

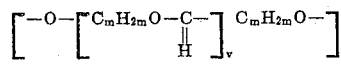

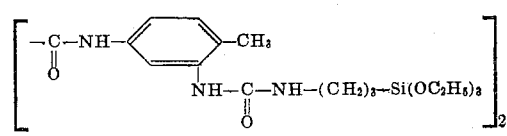

where v is a number ranging between 3 and 4 and m is 6.

6.

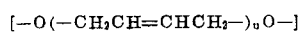

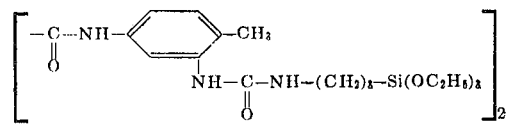

wherein the average value of u is 60 ± 5.

7.

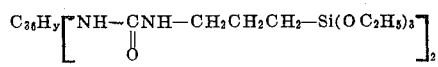

wherein the average value of y is approximately 66.

* * * * *